Figure 2:
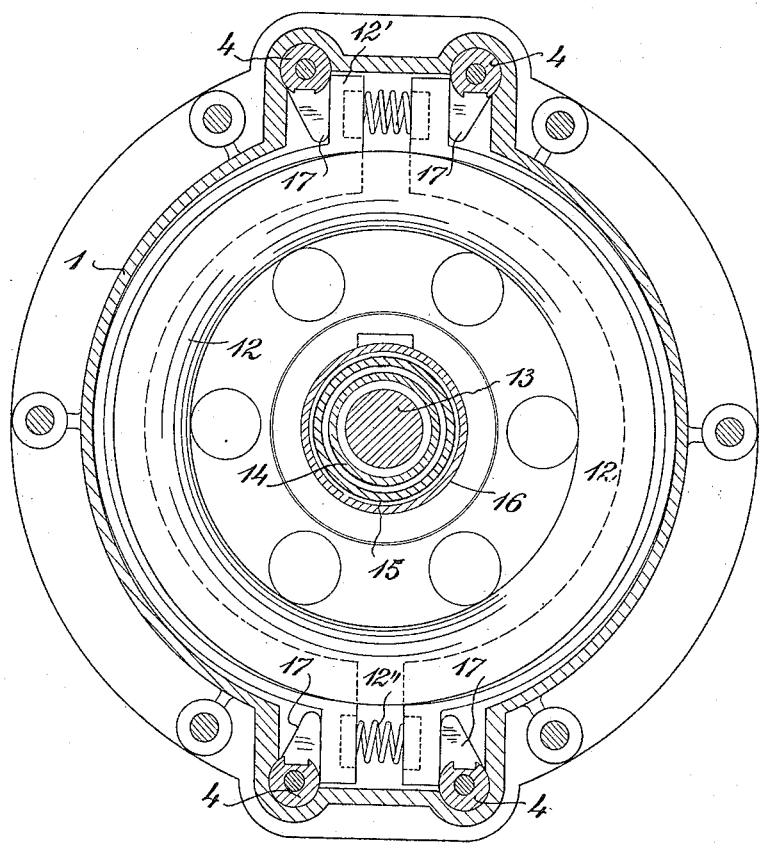

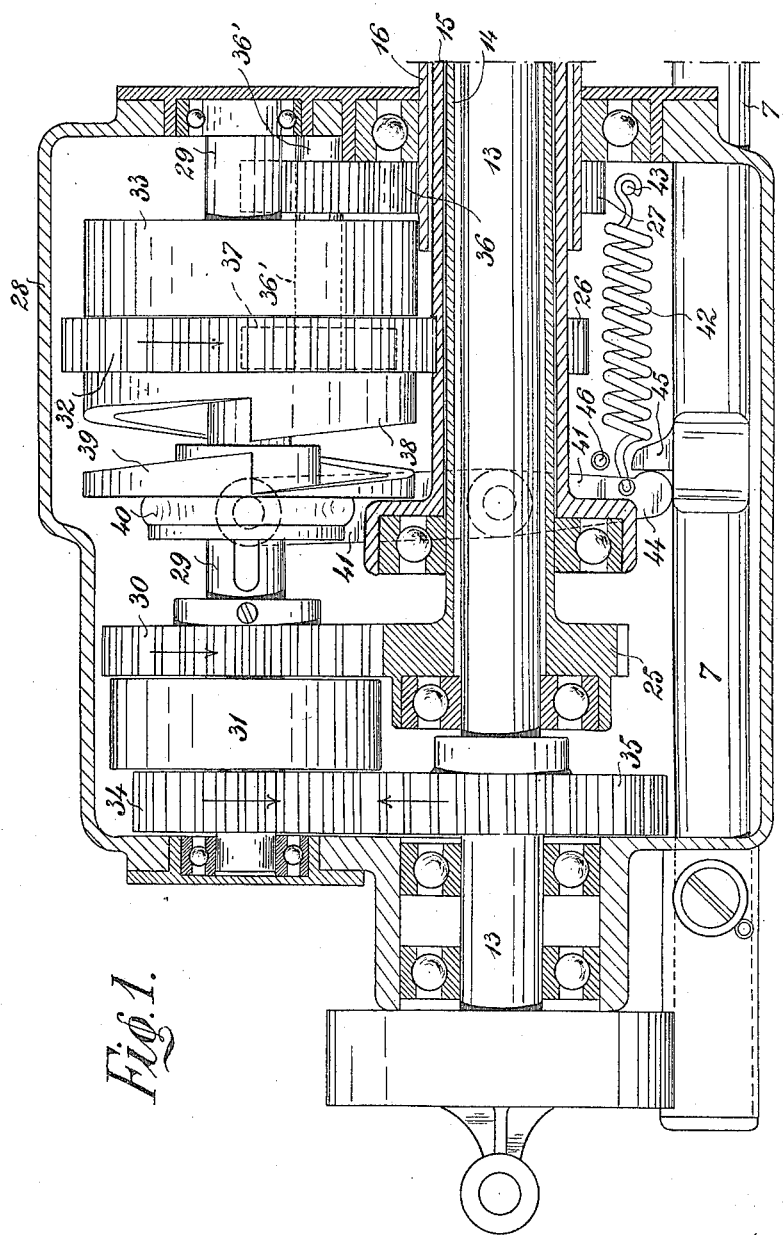

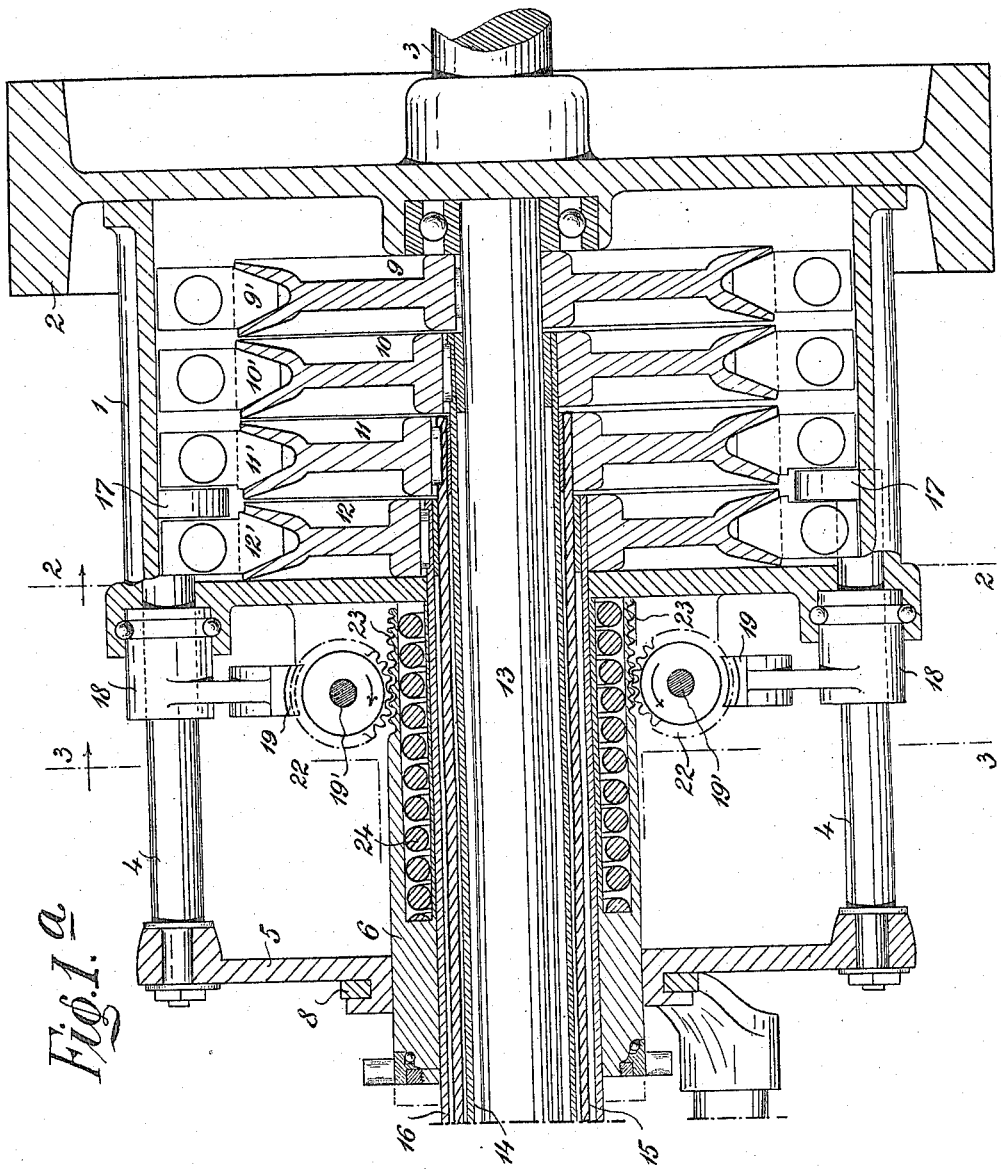

A. GOTTL & F. LOOS.
CHANGE SPEED GEARING.
APPLICATION FILED MAR. 1, 1913.

1,169,633.

Patented Jan. 25, 1916.
4 SHEETS—SHEET 3.

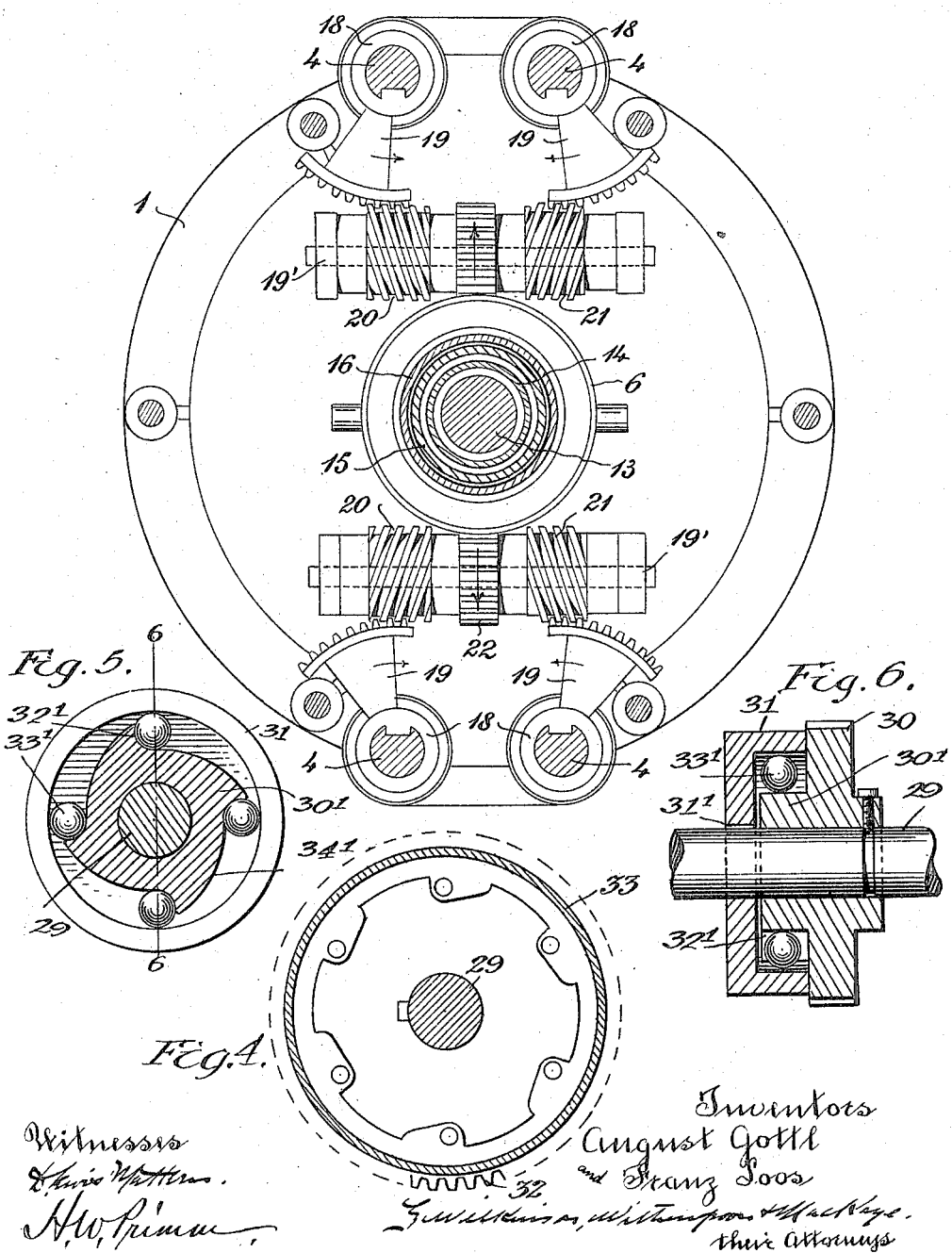

UNITED STATES PATENT OFFICE.

AUGUST GOTTL AND FRANZ LOOS, OF FISCHERN, NEAR CARLSBAD, AUSTRIA-HUNGARY.

CHANGE-SPEED GEARING.

1,169,633. Specification of Letters Patent. Patented Jan. 25, 1916.

Application filed March 1, 1913. Serial No. 751,639.

*To all whom it may concern:*

Be it known that we, AUGUST GOTTL and FRANZ LOOS, both subjects of the Emperor of Austria-Hungary, residing at Fischern, near Carlsbad, Empire of Austria-Hungary, have invented certain new and useful Improvements in Change-Speed Gearing; and we do hereby declare the following to be a full, clear, and exact description of the invention, such as will enable others skilled in the art to which it appertains to make and use the same.

This invention relates to change speed gearing for motor cars and the like in which between the driving and the driven shaft friction clutch members and a plurality of gears of different gear ratios are interposed.

The friction clutch members comprise a series of friction disks corresponding in number to the number of different speeds or gear ratios desired, each of which friction disks is adapted to be coupled individually with the driving shaft and each of which is permanently connected with a separate transmitting gear. The coupling of the friction disks is preferably brought about by divided friction rings connected with the driving shaft which rings on closing engage with the said disks. The rings are preferably closed by a set of clamping jaws adapted to be pushed and closed over the desired friction disk and to be opened by the driver.

In the annexed drawings Figure 1 is a longitudinal sectional view of part of a preferred construction of a change speed gearing embodying the present invention. Fig. 1ª is a similar view of the remaining part of the gearing. Figs. 2 and 3 are transverse sections on the lines 2, 2 and 3, 3, Fig. 1, looking in the direction of the arrows. Fig. 4 is a central sectional view of one of the gear wheels of the intermediate shaft. Fig. 5 a transverse sectional view of the free wheel mechanism associated with the gear 30; and Fig. 6 is a longitudinal sectional view taken on the line 6—6 of Fig. 5.

The change speed gearing comprises in the preferred construction shown in the drawings a casing 1 connected with the fly wheel 2 on the main shaft 3 of the motor (not shown) constituting the driving shaft.

4 are rocking shafts journaled in the casing 1 and a frame 5 adapted to slide axially along a sleeve 6 being operated for this purpose by a rod 7 engaging with it by means of a ring and groove connection 8.

Within the casing 1 friction disks 9, 10, 11 and 12 and friction rings 9', 10', 11' and 12' are mounted. Each of the friction rings is divided and provided with springs tending to separate from each other the parts of such divided friction rings that is to say to open such rings. Only one set of these springs is shown in the drawings to wit in Fig. 2 and numbered 12''. The friction disk 9 is keyed upon a shaft 13 and the disks 10, 11, 12 are keyed on sleeves 14, 15 and 16 respectively co-axial with the shaft 13.

The number of the friction disks correspond to the number of different speeds forward and backward desired. In the construction shown in the drawing the disks 9, 10, 11 are designed for forward running, the disk 9 serving for the highest speed and the disks 10 and 11 for lower speeds while the disk 12 is designed for backward running.

On each of the rocking shafts 4 a clamping jaw 17 is keyed (Fig. 2) and furthermore a sleeve 18 is mounted which is adapted to turn with and to slide along such rocking shaft. Each of the sleeves 18 carries a worm wheel segment 19 and the worm wheel segments corresponding to coöperating clamping jaws engage with oppositely pitched worms 20, 21 on a common shaft 19' which also carries a pinion 22 engaging into a rack 23 on the sleeve 6. This sleeve is adapted to slide on the outermost sleeve or hollow shaft 16 and is operated by the driver through the medium of a suitable link and lever gearing against the action of a spring 24 interposed between the sleeve 6 and the casing 1 and tending to force such sleeve into one of its extreme positions.

When the sleeve moves outward under the action of the spring 24 the pinions 22 are revolved in the directions of the arrows and the rocking shafts 4 are rotated through the medium of the sleeves 18, worm segments 19 and worms 20, 21 in such a direction that the coöperating clamping jaws 17 close the friction ring in front of them and cause it to engage with the corresponding friction disk, so that the latter is driven with the speed of the shaft 3. If it is desired to drive another of the friction disks the sliding sleeve 6 is pushed by the driver toward the casing 1 overcoming the pressure of the spring 24 whereby the pinions 22 are revolved in the opposite direction and the clamping jaws 17 are turned outward thus opening the corresponding friction ring. The driver then shifts the sliding frame 5 axially so far that the clamping jaws (which are then in the open position shown in Fig. 2) are opposite the desired friction disk. The sliding sleeve 6 is then released whereupon it is thrown outward by the spring 24 until the clamping jaws 17 again move toward each other closing the friction ring of the selected friction disk thus throwing into action the latter whereby the desired speed is obtained.

Each of the hollow shafts 14, 15, 16 of the friction disks 10, 11, 12 carries in the construction shown a spur wheel 25, 26, 27. These spur wheels together with the wheels engaging therewith and the bearings of the hollow shafts and of the driven shaft are mounted in a casing 28 secured in the car frame. One end of the shaft 13 is geared in any suitable manner with the driving axle and the other end of the shaft 13 passes through the casing 28 and projects into the casing 1 carrying the friction disk 9 as already stated. Preferably this end of the shaft is journaled in the fly wheel of the motor. On the shaft 13 the hollow shaft 14, on the latter the hollow shaft 15 and so on are journaled in any suitable manner.

In the casing 28 an intermediate shaft 29 is journaled which carries the gear wheels for all speeds, the gear wheel 25 on the hollow shaft 14 meshing with a gear wheel 30 loose on the shaft 29 and carrying one part of a free wheel mechanism, the other part of which is keyed on the shaft 29. Although the free wheel mechanism may be constituted of any of a variety of clutches, the same preferably consists of a ball clutch such as is illustrated more particularly in Figs. 5 and 6 to consist of a flanged member 31, keyed or otherwise secured to rotate with the shaft 29, as indicated at 31', the same constituting the outer member of the clutch mechanism. The inner member 30' is advantageously cast with the gear wheel 30, or secured thereto in any desired manner, and is provided with a plurality of recesses 32' for receiving balls 33' normally lying within said recesses and out of contact with the interior wall of the member 31. The interior member 30' is further constructed with cam faces 34' for forcing the balls 33' into engagement with the interior wall of the member 31 when the gear wheel 30 is rotated in a counter-clockwise direction. As will be understood, this engagement binds the members of the clutch mechanism to rotate together, and motion is thereby transmitted to the shaft 29. The gear wheel 26 on the hollow shaft 15 meshes with the gear wheel 32 associated with a free wheel mechanism, preferably similar to the free wheel mechanism illustrated in Figs. 5 and 6 and shown indicated generally at 33, the other part of which is keyed on the shaft 29. Fast on the end of the shaft 29 is a gear wheel 34 meshing into a gear wheel fast on the shaft 13. On the hollow shaft 16 of the friction disk 12 for the backward movement a gear wheel 27 is mounted which meshes into the gear wheel 36 on a shaft 36' journaled in the casing 28 and carrying another gear wheel 37 engaging with the gear wheel 32 whereby the shaft 29 is driven in the reverse direction. The gear wheel 32 carries one part of a free wheel mechanism 38 the other part 39 of which is mounted on the shaft 29 in such a manner that it revolves with and is adapted to slide along the same. This part 39 of the free wheel mechanism is connected with the throwing out lever 41 by a ring 40 in the well known manner. The lever 41 is pivoted in the casing, 28, its free end 44 bearing against a stop 45 on the bar 7. Moreover this end 44 of the lever 41 is connected by a spring 42 with a bolt 43 in the casing 28 so that the free end of the lever 41 is always drawn toward the right hand side of Fig. 1 against the stop 46.

The operation of this change speed gearing is as follows: Assuming the change speed gearing to be in the inoperative position shown in Fig. 1 in which the clamping jaws 17 together with the slide frame 5 are so located that the former are between the friction rings 11' and 12' of the friction disks 11 and 12 respectively, that is to say in inoperative position, then, when it is desired to start the change speed gearing the driver pushes the slide sleeve 6 toward the casing 1 so that the clamping jaws 17 separate as shown in Fig. 1. For throwing on the first speed, that is to say, for throwing into gear the friction disk 11 the slide frame 5 is pushed by means of the rod 7 so far toward the casing 1 that the clamping jaws come opposite the friction ring 11' of the disk whereupon the rod 7 is locked in any suitable manner in this position. Then the slide sleeve 6 is released and is thrown forward by the spring 24 whereby the clamping jaws 17 are moved toward each other as above explained that is to say the friction disk 11 is coupled with the driving shaft 3. By means of the hollow shaft 15 and the gear wheel 26 the gear wheel 32 is driven which through the medium of the free wheel mechanism 33, the shaft 29 and the gear wheels 34, 35 drives the shaft 13 and hence the axle of the wheels.

If it is desired to pass over to other speeds the operations just described are repeated; at the highest speed the friction disk 9 directly drives the shaft 13. For backward movement the sliding frame 5 is pushed away from the casing 1 when the change speed gearing is in the idle or free run position, otherwise the manipulations just described are the same. The friction disk for the backward movement drives by means of the hollow shaft 16 and the gear wheels 27, 36 and 37 the wheel 32. On shifting the sliding frame 5 the clutch halves 38, 39, Fig. 1, are brought into engagement with each other by means of the rod 7 and the lever 41 so that the gear wheel 32 drives the shaft 29 and thereby also the shaft 13 through the medium of the clutch 38, 39. On throwing out of action the backward movement mechanism, the clutch halves are automatically disengaged by the action of the spring 42.

By the change speed gearing the speeds may be changed without shock and jar and the gears of the speeds not thrown on are at rest; owing to the use of the free wheel mechanisms the permanent engagement of the gear wheels reduces the wear of the same and insures a continuous exact meshing and avoids any noise on changing the speed. By using only one set of clamping jaws and by connecting the gearing for the backward movement with the gearing for one of the forward speeds the entire structure is notably simplified and its reliability increased.

Claims:

1. In a change speed gearing the combination of a driving shaft; a casing connected to be driven from said driving shaft; a driven shaft; a plurality of co-axial counter-shafts mounted on the driven shaft; friction wheels mounted on said counter-shafts, respectively; friction rings mounted in said casing and adapted to engage with said friction wheels; selective means for moving said friction rings to engage with said friction wheels; driving connections between said counter-shafts and the driven shaft; and a direct driving connection between said driving and driven shafts, substantially as described.

2. In a change speed gearing the combination of a driving shaft; a casing connected to be driven from said driving shaft; a driven shaft; a plurality of co-axial counter-shafts mounted on the driven shaft; friction wheels mounted on said counter-shafts, respectively; friction rings mounted in said casing and adapted to engage with said friction wheels, respectively; clamping jaws slidably mounted on said casing; means for actuating said clamping jaws to selectively engage and move said friction rings to engage said friction wheels; driving connections between said counter-shafts and the driven shaft; and a direct driving connection between said driving and driven shafts, substantially as described.

3. In a change speed gearing the combination of a driving shaft; a casing connected to be driven from said driving shaft; a driven shaft; a plurality of co-axial counter-shafts mounted on the driven shaft; friction wheels mounted on said counter-shafts, respectively; friction rings mounted in said casing and adapted to engage with said friction wheels, respectively; rocker shafts mounted on said casing; clamping jaws mounted on said rocker shafts and adapted to engage with said friction rings, respectively; means for shifting said rocker shafts whereby to position said clamping jaws to selectively engage with said friction rings; a device associated with said rocker shafts for automatically actuating said clamping jaws; driving connections between said counter-shafts and the driven shaft; and a direct driving connection between said driving and driven shafts, substantially as described.

4. In a change speed gearing the combination of a driving shaft; a casing connected to be driven from said driving shaft; a driven shaft; a plurality of co-axial counter-shafts mounted on the driven shaft; friction wheels mounted on said counter-shafts, respectively; friction rings mounted in said casing and adapted to engage with said friction wheels; rocker shafts slidably mounted on said casing; clamping jaws mounted on said rocker shafts and adapted to engage with and actuate said friction rings; means for sliding said rocker shafts to position said clamping jaws; a sleeve slidably mounted on said co-axial counter-shafts; gearing connections between said sleeve and said rocker shafts automatically operable to actuate said clamping jaws to engage said friction rings; driving connections between said counter-shafts and the driven shaft; and a direct driving connection between said driving and driven shafts, substantially as described.

5. In a change speed gearing the combination of a driving shaft; a casing connected to be driven from said driving shaft; a driven shaft; a plurality of co-axial counter-shafts mounted on the driven shaft; friction wheels mounted on said counter-shafts, respectively; friction rings mounted in said casing and adapted to engage with said friction wheels; rocker shafts slidably mounted on said casing; clamping jaws mounted on said rocker shafts and adapted to engage with and actuate said friction rings; means for sliding said rocker shafts to position said clamping jaws; a sleeve slidably mounted on said co-axial counter-shafts and provided with a rack; gear elements journaled on said casing and meshing with said rack; gear elements mounted on said rocker shafts and meshing with said rack gear elements whereby to actuate the clamping jaws through the sliding movement of said sleeve; driving connections between said counter-shafts and the driven shaft; and a direct driving connection between said driving and driven shafts, substantially as described.

6. In a change speed gearing the combination of a driving shaft; a casing connected to be driven from said driving shaft; a driven shaft; a plurality of co-axial counter-shafts mounted on the driven shaft; friction wheels mounted on said counter-shafts, respectively; friction rings mounted in said casing and adapted to engage with said friction wheels; rocker shafts slidably mounted on said casing; clamping jaws mounted on said rocker shafts and adapted to engage with and actuate said friction rings; means for sliding said rocker shafts to position said clamping jaws; a sleeve slidably mounted on said co-axial counter-shafts and provided with a rack; pinions journaled on said casing and meshing with said rack; screw and worm gearing connections between said rocker shafts and said pinions whereby to actuate the clamping jaws through the sliding movement of said sleeve; driving connections between said counter-shafts and the driven shaft; and a direct driving connection between said driving and driven shafts, substantially as described.

7. In a change speed gearing the combination of a plurality of counter-shafts; a driven shaft; selective means for driving said counter-shafts at different speeds comprising a slidable frame; an intermediate shaft connected to drive the driven shaft; a second intermediate shaft connected to be driven from one of said counter-shafts; gear wheels mounted on said first intermediate shaft and connected to be driven from the other of said counter-shafts; said second intermediate shaft having driving connection with one of said gear wheels of the first intermediate shaft; a clutch element associated with said gear wheel; a lever connected to said clutch element; and a connection between said clutch lever and said slidable frame operable to automatically throw said clutch element into engaging position through the movement of said sleeve, substantially as described.

8. In a change speed gearing the combination of a driving shaft; a driven shaft; co-axial counter-shafts mounted on said driven shaft; selective driving mechanism between said driving and counter-shafts; an intermediate shaft connected to drive the driven shaft; gear wheels mounted on said intermediate shaft; driving connections between certain of said counter-shafts and said gear wheels; a second intermediate shaft connected to drive one of said gear wheels for reversing the driven shaft; driving connections between said second intermediate shaft and one of said counter-shafts; a clutch element associated with the reverse driving gear wheel of the first intermediate shaft; a lever connected to said clutch element; selective controlling mechanism and an operative connection between said actuating lever and the selective controlling mechanism automatically operable to throw said clutch element into operative position through the movement of said controlling mechanism, substantially as described.

9. In a change speed gearing the combination of a driving shaft; a driven shaft; a plurality of coaxial shafts each having fast on it a friction clutch member; a plurality of friction clutch members fast on the driving shaft, one for each of the friction clutch members on the said coaxial shafts; means for bringing into engagement any one of the friction clutch members on the driving shaft with the friction clutch member on the corresponding one of said coaxial shafts; a gear wheel fast on the innermost of the coaxial shafts; means for coupling the said innermost shaft with the driven shaft; an intermediate shaft; a gear wheel fast on said intermediate shaft and meshing with the gear wheel on the said innermost shaft; gear wheels fast on the remaining coaxial shafts; gear wheels mounted on said intermediate shaft; free wheel mechanism interposed between the intermediate shaft and each of the last named gear wheels, each of said gear wheels fast on the remaining coaxial shafts meshing with one of said gear wheels mounted on said intermediate shaft; and means for reversing the direction of rotation of the intermediate shaft.

10. In a change speed gearing the combination of a driving shaft; a driven shaft; a plurality of coaxial shafts, each having fast on it a friction clutch member; a plurality of friction clutch members fast on the driving shaft, one for each of the friction clutch members on the said coaxial shafts; means for bringing into engagement any one of the friction clutch members on the driving shaft with the friction clutch member on the corresponding one of said coaxial shafts; means for coupling the said innermost shaft with the driven shaft; an intermediate shaft; a gear wheel fast on such intermediate shaft and meshing with the gear wheel on said innermost shaft; gear wheels fast on the remaining coaxial shafts; gear wheels mounted on the said intermediate shaft; free wheel mechanism interposed between the intermediate shaft and each of the last named gear wheels mounted thereon, each of said gear wheels fast on the remaining coaxial shafts meshing with one of the said gear wheels mounted on the said intermediate shaft; means for reversing the direction of rotation of the intermediate shaft, said means comprising an additional coaxial shaft, a friction clutch member fixed thereon, a friction clutch member fast on the driving shaft, a gear wheel fast on said additional shaft, an auxiliary shaft, two gear wheels fast on the same, one meshing with the gear wheel fast on said additional shaft and the other with one of the gear wheels mounted on the intermediate shaft, a clutch member fast on the last named gear wheel, a clutch member fast on the intermediate shaft; and means for simultaneously throwing into and out of engagement the friction clutch member fixed on said additional shaft with the corresponding friction clutch member fast on the driving shaft, and the clutch member fast on the last named gear wheel with the said clutch member fast on the intermediate shaft.

11. In a change speed gearing the combination of a driving shaft; a driven shaft; a plurality of coaxial shafts in line with the driving shaft, each having fast on it a friction disk; a plurality of divided friction rings fast on the driving shaft, one for each of the friction disks on the said coaxial shafts and inclosing its friction disk, said friction disks and friction rings being arranged side by side along the axis of the coaxial shafts; means for closing any one of said divided friction rings individually on its friction disk, said means comprising a set of clamping jaws; means for shifting said clamping jaws along the axis of the coaxial shafts; means for moving said clamping jaws toward and away from each other; a gear wheel fast on the innermost of the coaxial shafts; means for coupling the said innermost shaft with the driven shaft; an intermediate shaft; a gear wheel fast on said intermediate shaft and meshing with the gear wheel on the said innermost shaft; gear wheels fast on the remaining coaxial shafts; gear wheels mounted on said intermediate shaft; free wheel mechanism interposed between the intermediate shaft and each of the last named gear wheels mounted thereon, each of said gear wheels fast on the remaining coaxial shafts meshing with one of the said gear wheels mounted on the said intermediate shaft; and means for reversing the direction of rotation of the intermediate shaft.

12. In a change speed gearing the combination of a driving shaft; a driven shaft; a plurality of coaxial shafts in line with the driving shaft, each having fast on it a friction disk; a plurality of divided friction rings fast on the driving shaft, one for each of the friction disks on the said coaxial shafts and inclosing its friction disk, said friction disks and friction rings being arranged side by side along the axis of the coaxial shafts; means for closing any one of such divided friction rings individually on its friction disk, said means comprising a slide frame revolving with the driving shaft and adapted to slide along the coaxial shafts; rocking shafts mounted in such frame and parallel to the axis of the coaxial shafts; clamping jaws mounted on such rocking shafts; a slide sleeve adapted to slide along the coaxial shafts and provided with rack teeth; pinions journaled in the slide frame and engaging with such rack teeth and adapted to rock the said rocking shafts; projections on the said divided friction rings adapted to engage with the said clamping jaws; and means comprising a spring for moving the slide sleeve to and fro along the coaxial shafts, and a set of clamping jaws; means for shifting said clamping jaws along the axis of the coaxial shafts; means for moving said clamping jaws toward and away from each other; a gear wheel fast on the innermost of the coaxial shafts; means for coupling the said innermost shaft with the driven shaft; an intermediate shaft; a gear wheel fast on said intermediate shaft and meshing with the gear wheel on the said innermost shaft; gear wheels fast on the remaining coaxial shafts; gear wheels mounted on said intermediate shaft; free wheel mechanism interposed between the intermediate shaft and each of the last named gear wheels mounted thereon, each of the said gear wheels fast on the remaining coaxial shafts meshing with one of the said gear wheels mounted on the said intermediate shaft, and means for reversing the direction of rotation of the intermediate shaft.

In testimony whereof, we affix our signatures in presence of two witnesses.

AUGUST GOTTL.
FRANZ LOOS.

Witnesses:
H. CÖNIS,
FRZ. MARKERT.

Copies of this patent may be obtained for five cents each, by addressing the "Commissioner of Patents, Washington, D. C."